United States Patent
Männer

(10) Patent No.: US 11,703,822 B2
(45) Date of Patent: Jul. 18, 2023

(54) METHOD FOR OPERATING A MACHINE TOOL BY ADAPTING A PRECOMPILED MACHINE MODEL

(71) Applicant: SIEMENS AKTIENGESELLSCHAFT, Munich (DE)

(72) Inventor: Andres Männer, Claussnitz OT Diethensdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 83 days.

(21) Appl. No.: 16/977,760

(22) PCT Filed: Jan. 25, 2019

(86) PCT No.: PCT/EP2019/051856
§ 371 (c)(1),
(2) Date: Sep. 2, 2020

(87) PCT Pub. No.: WO2019/170320
PCT Pub. Date: Sep. 12, 2019

(65) Prior Publication Data
US 2020/0401100 A1    Dec. 24, 2020

(30) Foreign Application Priority Data
Mar. 6, 2018 (EP) ...................................... 18160189

(51) Int. Cl.
G06F 8/35    (2018.01)
G05B 19/402    (2006.01)
G06F 16/903    (2019.01)

(52) U.S. Cl.
CPC ............. G05B 19/402 (2013.01); G06F 8/35 (2013.01); G06F 16/90335 (2019.01); *G05B 2219/35414* (2013.01)

(58) Field of Classification Search
CPC ...... G05B 13/021; G05B 13/04; G05B 19/18; G05B 19/4083; G05B 19/0426;
(Continued)

(56) References Cited

U.S. PATENT DOCUMENTS

| | | | |
|---|---|---|---|
| 9,880,817 B2* | 1/2018 | Tanguy | G06F 40/117 |
| 2012/0065767 A1* | 3/2012 | Oiwa | G05B 19/409 |
| | | | 700/159 |
| 2015/0052443 A1 | 2/2015 | Mitschele et al. | |
| 2015/0055085 A1 | 2/2015 | Shin et al. | |
| 2016/0314431 A1 | 10/2016 | Quezada | |

FOREIGN PATENT DOCUMENTS

| | | |
|---|---|---|
| CN | 105637512 A | 6/2016 |
| WO | WO 2007083855 A1 | 7/2007 |

OTHER PUBLICATIONS

Madhuri A. Potey et al., Enforcing Adaptive User Modeling Using Ontology, IEEE, 2014, retrieved online on Mar. 23, 2022, pp. 1-5. Retrieved from the Internet: <URL: https://ieeexplore.ieee.org/stamp/stamp.jsp?tp=&arnumber=7033830>. (Year: 2014).*

(Continued)

*Primary Examiner* — Hanh Thi-Minh Bui
(74) *Attorney, Agent, or Firm* — Henry M. Feiereisen LLC

(57) ABSTRACT

In a method for operating a machine tool and a corresponding machine tool system, a generic first data model and engineering data are provided in an external server device. The engineering data contain information relating to a machine tool. After a user query regarding an operation of the machine tool, the first data model is translated and/or modified to become a second data model. This occurs in accordance with the engineering data and technical data of (Continued)

the user query by the external server device. The second data model is transferred from the external server device to the machine tool, and a control unit of the machine tool can operate the machine tool according to the second data model. The machine tool can thus be adapted outside the running time of the machine tool.

15 Claims, 1 Drawing Sheet

(58) Field of Classification Search
CPC ........... G05B 2219/35414; G06F 16/00; G06F 16/903; G06F 16/90335; G06F 8/35
See application file for complete search history.

(56) References Cited

OTHER PUBLICATIONS

P. Aarnio, V. Vyatkin and D. Hästbacka, "Context modeling with situation rules for industrial maintenance," 2016 IEEE 21st International Conference on Emerging Technologies and Factory Automation (ETFA), Berlin, Germany, 2016, pp. 1-9, doi: 10.1109/ETFA.2016.7733539. (Year: 2016).*

Yang Zhi-Wei et al., "Disscussion on intelligent Service Model in the Industrial Internet Era", Kocel Mould Co., Ltd., Yinchuan Ningxia 750021, China, pp. 52-54+60, No. 6, Dec. 25, 2017.

Hou Yuxin, "Application of i5 series intelligent machine tool in field of medial device manufacturing", Metal working (cold working), 15, Aug. 1, 2017.

* cited by examiner

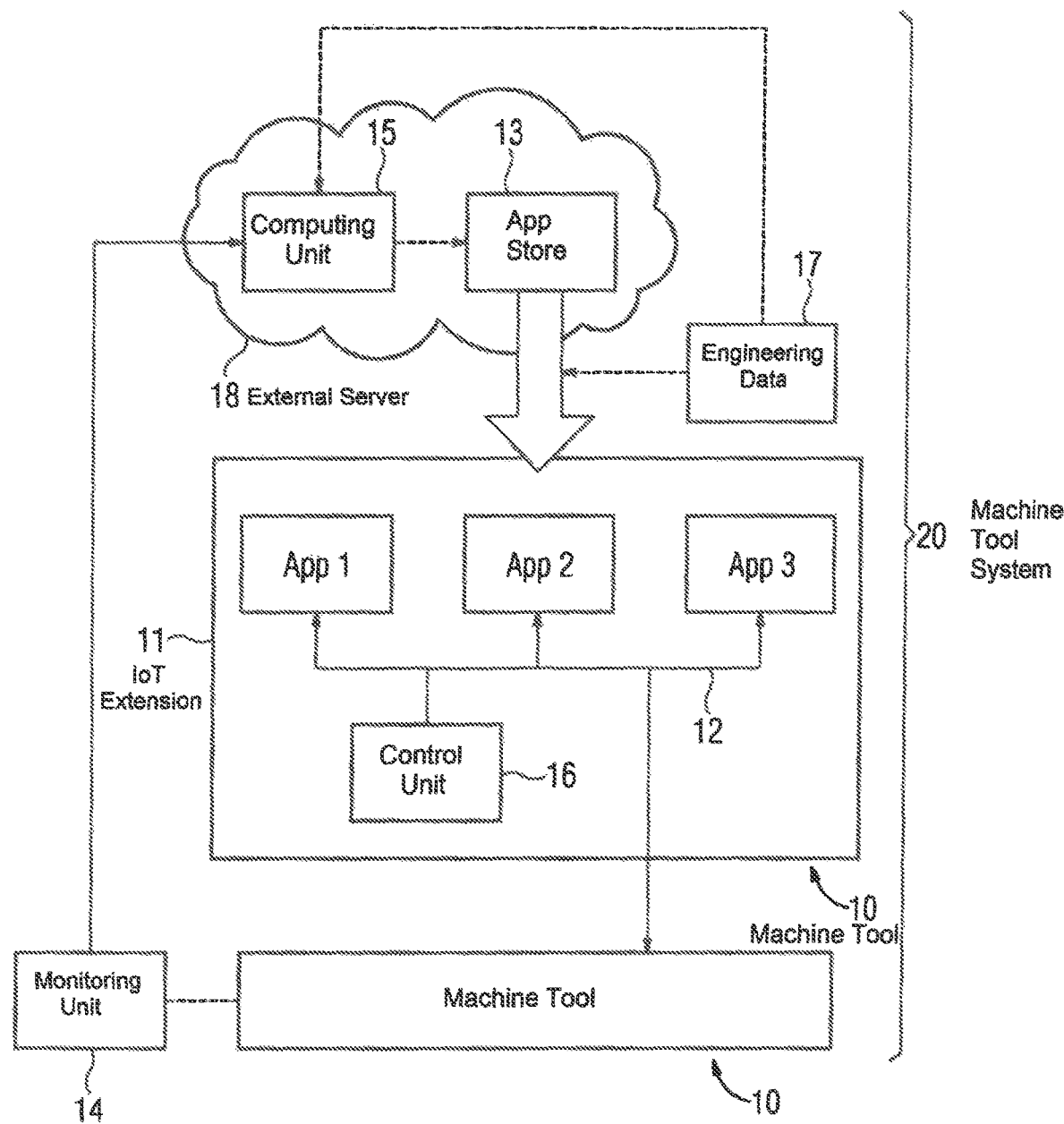

001# METHOD FOR OPERATING A MACHINE TOOL BY ADAPTING A PRECOMPILED MACHINE MODEL

CROSS-REFERENCES TO RELATED APPLICATIONS

This application is the U.S. National Stage of International Application No. PCT/EP2019/051856, filed Jan. 25, 2019, which designated the United States and has been published as international Publication No. WO 2019/170320 A1 and which claims the priority of European Patent Application, Serial No. 18160189.9, filed Mar. 6, 2018, pursuant to 35 U.S.C. 119(a)-(d).

BACKGROUND OF THE INVENTION

The present invention relates to a method for operating a machine tool. Moreover, the present invention relates to a machine tool system with an external server device and a machine tool.

A machine tool is a complex amalgamation of various logical and physical components of diverse multiplicity. The quantity, diversity and importance of the underlying data structures are specific to the components and the project planning. This means that the underlying data structure can be embodied differently in accordance with the application and the required use. This data structure is in particular described by a specific and implicit data model. In Industry 4.0 and IoT (Internet of Things), this specific and implicit data model of a machine tool is "mapped" to a generic and consistent data model. In this case, mapping means that the generic data model is translated and/or modified such that it becomes a specific data model. This enables a uniform interface to be offered to diverse apps.

As a rule, the specific application provides for the functionality of a machine to be expanded with additional functions from a cloud. These additional functions can be offered in an app store without knowledge of the specific structure of the respective machine tool. This means that a generic data model that roughly describes the machine tool without knowledge of all the technical details of a special machine tool is held in an app store. Hence, the machine's internal architecture is based on another data model than that used for communicating with apps from the cloud. The translation and/or modification of these data models (mapping) results in architectural disadvantages and possible performance deficits during the running time of the machine tool. This is because the specific data model does not match the generic data model and a corresponding transformation of one of these data models is necessary. Moreover, this necessitates modification and/or expansion of the implementation of the machine. To date, the corresponding data models are implemented in the region of the machine tool (for example, on the server side within an OPC server or on the client side within the app).

Hence, the object of the present invention is to provide a method by which a machine tool can be operated more efficiently.

SUMMARY OF THE INVENTION

This object is achieved with reference to the independent claims. Useful developments may be derived from the subclaims.

The present invention provides a method for operating a machine tool. To this end, the following method steps are executed. A machine tool has an interface (hereinafter also called the first interface) to an external server device. A machine tool is in particular a machine for producing workpieces with tools. The movement of the tools relative to one another is specified by the machine tool. The machine tool can be embodied as a lathe, a milling machine, an eroding machine and as a mechanical press or machine hammers for forging. The machine tool can also be embodied as a CNC machine. A generic first data model is provided in the external server device. This generic first data model is in particular also a consistent data model. Such a first generic data model is able to describe a plurality of machine tools in a general manner. As a rule, the generic first data model is not tailored to a specific machine tool.

Engineering data is provided to the external server device, wherein the engineering data contains information specifically relating to the machine tool. Engineering data can in particular contain information on processes that are required during the operation of the machine tool. Hence, engineering data describes more than just pure technical information, which could, for example, only have the dimensions of a machine tool as such. Hence, the engineering data can in particular contain information specific to the operation of the machine tool.

Furthermore, a user query regarding an operation of the machine tool is generated to the external server device. The user query can, for example, relate to the manufacture of a desired workpiece. Thus, the user query can, for example, include a request to manufacture a flange from a metal blank in accordance with a technical drawing. In many cases, therefore the user query relates to the manufacture of a desired workpiece. The type and shape of the workpiece can, for example, be specified by means of a technical drawing or a dataset. This means that the user query is not a general question, such as, for example, a question about the current weather.

The generic first data model is translated and/or modified to become a second data model in dependence on the engineering data by the external server device, triggered by the user query. This means in particular that the translation and/or modification of the generic first data model does not take place independently of the user query. The method step of translation and/or modification is only initiated when a user query is issued. Herein, it is not absolutely necessary for the user query to be issued manually by a human. The user query can, for example, also be stored in advance in a control program. The triggering of the user query can be provided in a prespecified segment of time or at a prespecified point of time.

The second data model is transferred from the external server device to the machine tool. At the same time, it can in particular be provided that the second data model is installed and configured for operation on the machine tool. The transfer of the second data model from the external server device to the machine tool preferably takes place via an Internet connection. This means the machine tool can be connected to the external server device via a computer network (in particular the Internet). This means that the external server device can be configured as a cloud-based server.

Lastly, the machine tool is then operated in accordance with the second data model. The operation of the machine tool is preferably performed by a control unit of the machine tool. In special cases it can also be provided that a computing unit of the external server device controls the machine tool remotely. This case would represent remote control. However, as a rule it is provided that, after the transfer of the second data model, the machine tool can also be operated independently of the external server device.

The engineering data in particular contains implicit knowledge of the machine tool. Since this engineering data is provided to the external server device, the computing effort for translating and/or modifying the first generic data model can be removed from the machine tool running time. This means that, with this method, the reprogramming of the first generic data model in the second data model can take place outside the machine tool. Reprogramming means the process of translation and/or modification. This process is often also referred to as "mapping" or adapting. This means that the external server device can have various apps and these apps can be adapted by the external server device such that these apps understand the specific data structure of the machine tool. In other words, the apps, which are initially generic and in general form, can be compiled in a machine-specific manner such that these apps can be used on the machine tool. Herein, the process of compiling, programming, translating and/or modifying is preferably executed outside the machine tool. Herein, the term compilation in particular refers to the conversion of a program code into an executable code. This means that the first generic data model can be converted into an executable second data model with the aid of a compilation process. Translation and/or modification of the first data model can in particular also include a compilation so that the second data model can be executed by the machine tool. Hence, the second data model can be used to put the machine tool into operation and operate it in accordance with the specifications of the second data model, which takes account of the user query. The fact that the computing effort for the compilation is removed from the machine tool running time, can achieve considerable advantages with regard to the performance of the machine tool. For example, a second data model can be compiled outside the machine tool, which is adapted for the specific operation of the machine tool.

A further variant of this invention provides that technical data in the user query is taken into account for the translation and/or modification of the first generic data model. The technical data in the user query can, for example, have information on the material, the dimensions of the workpiece to be manufactured and further structural properties and their production steps. Thus, the user query can, for example, contain information as to whether the holes in a flange should be embodied as through-holes or threaded holes. In this variant of the invention, this information is taken into account when compiling the second data model. This enables the translation and/or modification of the first generic data model to be selectively influenced in accordance with desired specifications. Hence, this enables flexible operation of the machine tool.

A further variant of the invention provides that the first data model is translated from a first programming language into a different second programming language and modified in the second programming language to become the second data model. If the programming language of the first data model and the second data model is identical, translation into another programming language is not absolutely necessary. However, if the first data model is in a different programming language from that of the second data model, in this variant of the invention, the first data model is translated from the first programming language into the second programming language. Hence, the adaptation of the first data model can also be used with other machine tools, which, for example, have a different software architecture. For example, an SQL data model can be translated into an OPCA data model or vice versa. Hence, this enables the principle according to the invention also to be used across platforms with other machine tools with a different software architecture.

A further variant of this invention provides that a computing unit of the external server device installs the second data model on the machine tool for operation. In this case, the external server device takes over not only the translation and/or modification of the first generic data model to become the second data model, but moreover also the installation of the second data model on the machine tool. This means that the computing unit of the external server device can transfer the second data model to the machine tool and configure it to run there. Hence, the installation process can also be outsourced from the machine tool. Hence, the machine tool can also be additionally relieved during the installation process relating to the second data model. This can further improve the performance of the machine tool.

A further variant of the invention provides a machine tool system with an external server device having a computing unit. This machine tool system also comprises a machine tool, having a first interface for communicating with the external server device. Moreover, the machine tool has a control unit, wherein the control unit is embodied to transmit a first generic data model via the first interface to the external server device and to receive a second data model via the first interface and to operate the machinery in accordance with the second data model.

At the same time, the computing unit of the external server device is embodied to translate and/or modify the first generic data model into the second data model. This means in particular that the conversion of the first generic data model into the second data model (specifically for the machine tool in question) is primarily executed by the computing unit of the external server device, Thus, the control unit of the machine tool can be relieved of the task of translation and/or modification. The control unit of the machine tool is preferably used for the operation of the machine tool in accordance with the specific second data model. Herein, the specific second data model is preferably compiled by the computing unit of the external server device and is in particular adjusted for the machine tool in question. The advantages mentioned in the method steps and the associated variants also apply analogously to the machine tool system.

A further variant of the machine tool system provides that the machine tool is embodied to receive a plurality of second data models via the first interface and/or the control unit is embodied to operate the machine tool in accordance with the plurality of second data models. This means in particular that the control unit of the machine tool is not only able to use one single second data model for the operation of the machine tool. It can, for example, be provided that the control unit is intended to convert a plurality of user queries. These user queries may differ in respect of their technical implementation. Thus, for example, a first user query can provide that a flange is to be created with threaded holes and a second user query can, for example, provide that a cube is to be manufactured with holes. Moreover, it can be provided that the respective workpieces should be different with these two user queries. In this case, the computing unit of the external server device can provide two different data models. These two different data models can be transferred to the machine tool and installed there.

The control unit of the machine tool can now access these two different data models via a corresponding data bus system. Hence, in this case, the control unit of the machine tool can control the machine tool such that the first user query is implemented first and then the second user query. This enables complex production steps to be divided into a plurality of second data models. The respective second data models can be integrated in the corresponding applications (apps). Hence, the second data models can be made clearer. Thus, the machine tool can implement different user queries, which can further increase the flexibility of the machine tool.

A further variant of the invention provides a machine tool system, wherein the machine tool is connected to a monitoring unit and/or the user query can be transferred via the second interface by means of the monitoring unit. The machine tool can, for example, have a touchscreen (a screen that is sensitive to touch) via which the user query can be input. In the further course of the method, the user query can be transmitted in this way to the external server device. Instead of a touchscreen, a computer can also be connected to the machine tool. In this case, the user query can be transmitted via the computer to the machine tool and subsequently via the second interface to the external server device. However, it can also be provided that the monitoring unit has a direct communication connection with the external server device and the user query is transmitted via this direct communication connection. Hence, it is possible for the user query to be transferred directly from the monitoring unit to the external server device. In this special case, the second interface is now not arranged in the machine tool, but on the monitoring unit. This enables the user query to be compiled without herein having to use the machine tool. Thus, the monitoring unit can compile the user query in advance wherein it can subsequently be converted to become the second data model before the activation of the machine tool. This enables the machine tool also to be configured offline in advance. If the machine tool is activated, it can receive the correspondingly adapted second data model from the external server device via the first interface and operate it accordingly. In this variant of the invention, it is not necessary for the user query to be compiled in the environment of or within the machine tool. This can also take place at a different location where the machine tool is not present.

A further variant of this invention provides a machine tool system, wherein the machine tool has a second interface and/or an input apparatus for transmitting and/or inputting a user query regarding an operation of the machine tool. In this case, the user query can be compiled directly on the machine tool and transmitted to the external server device. In this case, further additional devices can be omitted.

A further variant of this invention provides a machine tool system, wherein the computing unit of the external server device is connected via the first interface of the machine tool and is embodied to put the machine tool into operation in accordance with the second data model. This variant provides that the computing unit of the external server device is connected to the machine tool via the first interface. This data connection is preferably established precisely when the second data model is to be transferred from the external server device to the machine tool. In addition to purely transferring the second data model, it can in particular be provided that the computing unit configures the second data model on the machine tool such that the machine tool can be put into operation in accordance with the second data model. Accordingly, the machine tool can be commissioned via the computing unit of the external server device. However, the subsequent operation of the machine tool is preferably executed by the control unit of the machine tool. The connection between the external server device and machine tool can in particular be established by both the control unit of the machine tool and the computing unit of the external server device. If the monitoring unit is used, this is also able to establish the data connection. Hence, the machine tool can be put into operation by an external device and at the same time the operation of the machine tool specifically adapted in accordance with the user query. Herein, the user query is in particular realized via the second data model.

A further variant of this invention provides a machine tool system, wherein the external server device is embodied as a cloud-based server and connected at least temporarily to the machine tool via a computer network, which is in particular embodied as the Internet. A cloud-based server is in particular characterized by the fact that it can be located elsewhere from the site of the machine tool. The cloud-based server can, for example, even be located on a different continent from the machine tool. The cloud-based server can also be embodied as an in-house intranet. A temporary data connection from the machine tool to the cloud-based server can be established via the computer network. The second data model can then be transmitted from the cloud-based server to the machine tool via this data connection.

Herein, the transformation of the generic first data model to become the specific second data model is preferably performed by the computing unit of the cloud-based server. The computing unit of the cloud-based server can establish the data connection to the machine tool to transfer the second data model and also disconnect this data connection again after the successful transfer or configuration of the second data model on the machine tool. Herein, the data connection is preferably established via the Internet. This means in particular that the first interface of the machine tool can establish a connection to the computer network (Internet, intranet, another network). Hence, the machine tool can be connected to the cloud-based server via the Internet. Herein, the specific configuration of the machine tool in accordance with the user query is implemented by the cloud-based server or the computing unit thereof. This enables a plurality of and also different machine tools to be adapted and modified in accordance with the user query via a remote cloud-based server. To this end, the specific second data model is preferably mapped to the first generic data model. As a rule, a cloud-based server has sufficient computing power thus also enabling an entire machine park of machine tools to be adapted or serviced. This enables each individual machine tool in the machine park to be adapted specifically in accordance with the respective user query via the cloud-based server. This takes place as in the above examples by the corresponding translation and/or modification of the first generic data model to become the specific second data model. Herein, the specific second data model in particular takes account of the specific technical properties of the respective machine tool and the respective user query.

A further variant of this invention provides that the external server device has an app store that holds a precompiled second data model for operating the machine tool. Herein, the precompiled second data model can be provided by a machine tool system according to the invention and/or by a method according to the invention.

In many cases, it is desirable for a machine tool to execute certain activities repeatedly or more frequently. This can, for example, relate to the manufacture of a specific flange. In this case, a precompiled second data model can be held ready in the app store, which already holds the information for the machine tool to enable it to manufacture the flange.

The precompiled second data models preferably contain frequently issued user queries. If, for example, the manufacture of a cube is frequently requested, the app store can have a corresponding second data model containing information for manufacturing the cube for the machine tool.

Herein, these precompiled second data models can in particular be purchased in the app store. This means that the app store can also have a payment function, Hence, in the case of a new user query, it may be possible that the app store already contains a further precompiled second data model for this purpose, which is tailored to this user query. In this case, it is not necessary to compile the corresponding second data model additionally since it is already present in the app store. It only needs to be unlocked by the external server device. This can, for example, take place in the context of a payment process. After successful unlocking, the corresponding second data model can be transferred from the external server device or the cloud-based server to the machine tool. The control unit of the machine tool can then control it so that the user query can be executed. Hence, it is possible to equip the machine tool with the second data models required or desired by the user. This means that the machine tool can be individually equipped with different second data models. Hence, a park with a plurality of and also different machine tools can be embodied extremely flexibly.

Further features of the invention may be derived from the claims, the FIGURES and the description of the FIGURES. The features and combinations of features mentioned above in the description and features and combinations of features mentioned below in the description of the figures and/or features shown solely in the single FIGURE can be used not only in the combination disclosed in each case but also in other combinations without departing from the scope of the invention, Hence, embodiments that are not explicitly shown in the figures and explained but which may be derived and created from the explained embodiments by separate combinations of features should also be considered to be included and disclosed by the invention. Hence, embodiments and combinations of features which do not have all the features of an originally formulated independent claim should be considered to be disclosed. Moreover, embodiments and combinations of features that transcend or differ from the combinations of features set forth in references to the claims should in particular be considered to be disclosed by the above-described embodiments.

BRIEF DESCRIPTION OF THE DRAWING

The present invention is now explained in more detail with reference to the sole drawing attached. The following examples described represent preferred embodiments of the invention. However, these embodiments should not be interpreted as restrictive.

DETAILED DESCRIPTION OF PREFERRED EMBODIMENTS

The sole FIGURE shows a machine tool system 20 having a machine tool 10 and an external server device 18, The machine tool 10 can have an internal control unit 16 and a data bus 12. The control unit 16 of the machine tool 10 can access various apps via the data bus 12. Herein, the respective apps are transferred from the external server device 18 to a machine-specific IoT extension 11 of the machine tool 10. Moreover, the external server device 18 can have an app store 13, In addition, a computing unit 15 is located in the region of the external server device 18.

The following describes a possible example of how the machine tool system 20 can be used to manufacture a desired workpiece, for example a cabinet door, Obviously, it is also possible to manufacture other more complex workpieces. In this example, the cabinet door is to be a simple wooden plate with a plurality of holes embodied as through-holes. If an individual cabinet door is to be manufactured, this cabinet door can be specified by an individual corresponding user query. In this case, a plan of the cabinet door is transmitted to the external server device 18. This can, for example, take place via a monitoring unit 14. This means a precise plan relating to the cabinet door with the respective coordinates of the through-holes to be produced can be transmitted to the external server device 18 via the monitoring unit 14. Herein, the monitoring unit 14 can be arranged as a touchscreen directly on the machine tool 10. However, the monitoring unit 14 can also be connected to the machine tool 10 (indicated by dashed lines).

Instead of a prespecified plan relating to the cabinet door, it is possible to use precompiled models for the cabinet door. The app store 13 can, for example, have a range of a plurality of models for cabinet doors. In this case, a user would select just one model for the cabinet door in the app store 13 via the monitoring unit 14. Hence, there are different possibilities for transmitting the user query to the computing unit 15.

However, the computing unit 15 requires further information in order now to transform the first generic data model into the specific second data model. This information is above all specific engineering data 17. The engineering data 17 in particular contains information for operating the respective machine tool. As a rule, the engineering data 17 is provided by the machine tool manufacturer. In this example, the engineering data 17 can have information on the number and type of drills located on or in the machine tool 10. The engineering data 17 can also contain information on the number of movable axes and their spatial extent. Hence, as a rule, the engineering data 17 specifies the respective machine tool 10. The computing unit 15 of the external server device 18 now combines the engineering data 17 with the user query, which was transmitted by the monitoring unit 14. Herein, the user query can also take place by selecting a second data model in the app store 13. The computing unit 15 uses the information from the user query and the engineering data 17 as the basis for translating and/or modifying the first generic data model to become the second specific data model. This means the computing unit 15 transforms the generally held first data model into a specific second data model with which the machine tool 10 can manufacture the specific user query (desired cabinet wall). Instead of the term "transform" it is also possible to use other terms such as program, translate and/or modify or adapt. To this end, the specific second data model is modified or adapted by the computing unit 15 such that the machine tool 10 is able to read and process the second data model. This means in particular, that the computing unit 15 of the external server device 18 adapts the second data model in accordance with the data structure of the machine tool 10. The computing unit 15 hence in particular generates a program code that can be executed by the machine tool. The second data model is preferably adapted to the operating system and the programming language of the respective machine tool 10. Hence, the machine tool 10 or the control unit 16 of the machine tool 10 can process the second data model directly.

In this case, the computing unit 15 now compiles a specific second data model, which is tailored to the machine tool 10 to enable the desired cabinet wall to be manufactured. To this end, the first generic data model for the machine tool 10 is adapted by means of the engineering data 17. In this example, the respective coordinates of the through-holes are additionally stored or held on the wooden plate in the second data model. Hence, in this example, the specific second data model contains specific coordinates for the place in which through-holes are to be made. All further specifications such as, for example, the type of holes, the size of holes, etc, are also held in the second data model. Thus, the specific second data model contains a specific plan for manufacturing the desired cabinet door, which can also be read and processed by the machine tool 10.

Herein, this second data model is preferably compiled by the computing unit 15 within the external server device 18. After completion, the second data model generated in this way is transmitted to the machine-specific IoT extension 11. This preferably takes place via an Internet connection. The second data model can in particular be integrated in an app. The computing device 15 can in particular configure or install this app on the machine-specific IOT extension 11. This process can however also be performed by the control unit 16 of the machine tool 10. This means that the control unit 16 does not have to hold any resources for translating and/or modifying the first data model to become the second data model.

Viewed in another way, this invention can greatly relieve the control unit 16 or the machine tool 10 as a whole. Compared to data modeling of data mapping for functional extensions, this can have considerable advantages in respect of the performance of data processing and communication. Herein, the computing unit 15 can in particular take account of the fact that the machine tool 10 can only be actuated via another programming language. This means that the computing unit 15 can translate the first data model into a different second programming language and convert the first data model translated in this way accordingly to become the specific second data model. Hence, machine tools can be operated extremely flexibly without herein having to hold available an unnecessary amount of digital resources such as, for example, main memory, processor capacity, etc. for the respective machine tool. This invention enables the effort of compiling the second data model to be completely outsourced from the machine tool.

What is claimed is:

1. A method for operating a machine tool, comprising:
provide a generic first data model of the machine tool without describing details of the machine tool at a server device that is external to the machine tool;
provide engineering data to the external server device, wherein the engineering data contains information specifically related to the machine tool and knowledge of the machine tool;
generate a user query regarding an operation of the machine tool to the external server device, the user query containing technical data related to a process to be performed by the machine tool;
translate and/or modify, by the external server device, taking into account the technical data in the user query and the engineering data, the generic first data model into a second data model in response to the user query;
compile the second data model by the external server device so that the second data model can be executed on the machine tool;
integrate the compiled second data model into an app by the external server device;
transfer the app from the external server device to a machine-specific Internet-of-Things (IoT) extension of the machine tool;
access the app by a control unit of the machine tool via a data bus of the machine tool; and
operate the machine tool in accordance with the compiled second data model integrated in the app, thereby unburdening the machine tool from translating and/or modifying the generic first data model during operation of the machine tool.

2. The method of claim 1, further comprising translating the generic first data model from a first programming language into a different second programming language and modifying the generic first data model into the second data model in the second programming language.

3. The method of claim 1, further comprising, with a computing unit of the external server device, installing the compiled second data model on the machine tool for operating the machine tool.

4. The method of claim 1, wherein the machine tool receives via an interface a plurality of compiled second data models that have been integrated into a respective plurality of apps by the external server device, and/or wherein the machine tool is operated in accordance by the control unit of the machine tool with the plurality of apps.

5. The method of claim 1, further comprising:
expanding a functionality of the machine tool with additional functions from a cloud functioning as the external server device by offering the additional functions in an app store;
wherein the app store stores the gereric first data model that describes the machine tool without describing details of the machine tool and without knowledge of all technical details of a particular machine tool.

6. A machine tool system, comprising:
an external server device comprising a computing unit configured to receive engineering data that contains information specifically related to the machine tool and knowledge of the machine tool and configured to receive a user query regarding an operation of the machine tool, the user query containing technical data related to a process to be performed by the machine tool, and configured to translate and/or modify, in response to the user query, a generic first data model into a second data model outside a machine tool taking into account the technical data in the user query and the engineering data, thereby unburdening the machine tool from translating and/or modifying the generic first data model during operation of the machine tool, wherein the computing unit is also configured to compile the second data model so that the second data model can be executed on the machine tool and configured to integrate the compiled second data model into an app; and
the machine tool comprising a machine-specific Internet-of Things (IoT) extension, a first interface for communicating with the external server device, and a control unit configured to
transmit via the first interface to the external server device the generic first data model that describes the machine tool without details of the machine tool,
to receive, at the machine-specific IoT extension, via the first interface the app which is executable on the machine tool, and to operate the machine tool in accordance with the compiled second data model integrated in the app; and a data bus operatively coupling the control unit to the app. machine tool without describing details of the machine tool and without knowledge of all technical details of a particular machine tool.

7. The machine tool system of claim 6, wherein the machine tool has a second interface and/or an input apparatus for transmitting and/or inputting a user query regarding the operation of the machine tool.

8. The machine tool system of claim 7, wherein the machine tool is connected to a monitoring unit and/or the machine tool has the monitoring unit, and wherein the user query regarding the operation of the machine tool can be transferred by the monitoring unit via the second interface.

9. The machine tool system of claim 6, wherein the machine tool is configured to receive a plurality of apps via the first interface and/or the control unit is configured to operate the machine tool in accordance with the plurality of apps.

10. The machine tool system of claim 6, wherein the computing unit of the external server device is configured to install the app on the machine tool.

11. The machine tool system of claim 6, wherein functionality of the machine tool can be expanded with additional functions from a cloud operating as the external server device by offering the additional functions in an app store, wherein the app store stores the generic first data model that describes the machine tool without describing details of the machine tool and without knowledge of all technical details of a particular machine tool.

12. The machine tool system of claim 6, wherein the computing unit of the external server device is connected to the machine tool via the first interface and is configured to put the machine tool into operation in accordance with the app.

13. The machine tool system of claim 6, wherein the external server device is configured as a cloud-based server and is connected at least temporarily to the machine tool via a computer network.

14. The machine tool system of claim 13, wherein the computer network is the Internet.

15. The machine tool system of claim 6, wherein the external server device has an app store which comprises, for operating the machine tool, the second data model precompiled by the machine tool system and/or the second data model translated and/or modified from the generic first data model.

* * * * *